United States Patent
Little

[11] 3,902,179
[45] Aug. 26, 1975

[54] MULTIPLE CHANNEL GRAPHIC RECORDER

[75] Inventor: David A. Little, Methuen, Mass.

[73] Assignee: Gibson Motor and Machine Service, Inc., Lawrence, Mass.

[22] Filed: Apr. 11, 1974

[21] Appl. No.: 460,194

[52] U.S. Cl. .................. 346/49; 340/248 D; 346/17
[51] Int. Cl.² ............................................. G01D 9/32
[58] Field of Search ...... 346/49, 23, 17; 340/248 D, 340/248 A, 248 C, 248 R

[56] References Cited
UNITED STATES PATENTS

| | | | |
|---|---|---|---|
| 2,674,992 | 4/1954 | Gilson et al. | 346/49 X |
| 2,847,268 | 8/1958 | Cowper | 346/49 X |
| 3,201,776 | 8/1965 | Morrow et al. | 340/248 R |
| 3,300,785 | 1/1967 | Richardson et al. | 346/49 X |
| 3,453,645 | 7/1969 | Franklin et al. | 346/49 X |

Primary Examiner—Joseph W. Hartary
Attorney, Agent, or Firm—Pearson & Pearson

[57] ABSTRACT

Identified transducers mounted to a machine, such as a truck, produce audio signals. A transducer selection circuit connected to a selector switch couples, in each switch position, an audio signal from a transducer to an amplifier circuit. One channel of a multiple channel graphic recorder, receives the amplified signal and produces a graph. In each switch position, an encoder circuit transmits a unique pattern of signals to the other channels. Their respective pens record an identification of the specific transducer to thereby correlate the incoming signal and its respective transducer. A GO/NO GO circuit indicates signals which are outside a given range.

7 Claims, 4 Drawing Figures

MULTIPLE CHANNEL GRAPHIC RECORDER

BACKGROUND OF THE INVENTION

This invention is directed to unit for testing mechanical equipment and more specifically to a unit for analyzing the operation of mechanical parts using sonic testing techniques.

In the prior art, mechanical equipment is sonically tested by coupling transducers to critical parts of the equipment. These transducers generate audio signals which are characteristic of the operation of that part. The transducer signals are then coupled, one at a time, to a tape recorder, chart recorder, ear phones and other utilization circuits.

In those systems which provide a permanent record, there is no means for identifying automatically the source of the signal. Rather the operator must remember, as he changes channels, to mark an identification on the chart. Even when marked, comparative analysis with prior tests is somewhat difficult to undertake because it is difficult to correlate the tests.

Therefore, it is the object of this invention to provide a sonic testing unit in which a selective transducer is automatically identified on the permanent record.

Another object of this invention is to provide a sonic testing unit in which a graphical analysis of the testing sequence is prepared in a way to facilitate comparisons with prior tests.

SUMMARY

In accordance with this invention, a selection circuit couples one of several transducer outputs to a recorder. The selection circuit includes an encoder which generates a set of identification signals. Both the identification and the audio signals from the transducer are recorded simultaneously with a representation of an incoming signal on a multiple channel graphic recorder.

Thus, the resulting graph is a permanent record of each incoming transducer signal as each transducer is selected and delineates the source of each signal. There is no need for identifying manually the signal source. The resulting record also facilitates comparison with a prior equipment test, especially if the prior test is recorded on transparent material which can be laid over the graph from the current test.

This invention is pointed out with particularity in the appended claims. A more thorough understanding of the above and further objects of this invention may be attained by referring to the following description, taken in conjunction with the accompanying drawings.

DESCRIPTION OF A PREFERRED EMBODIMENT

Figure 1:
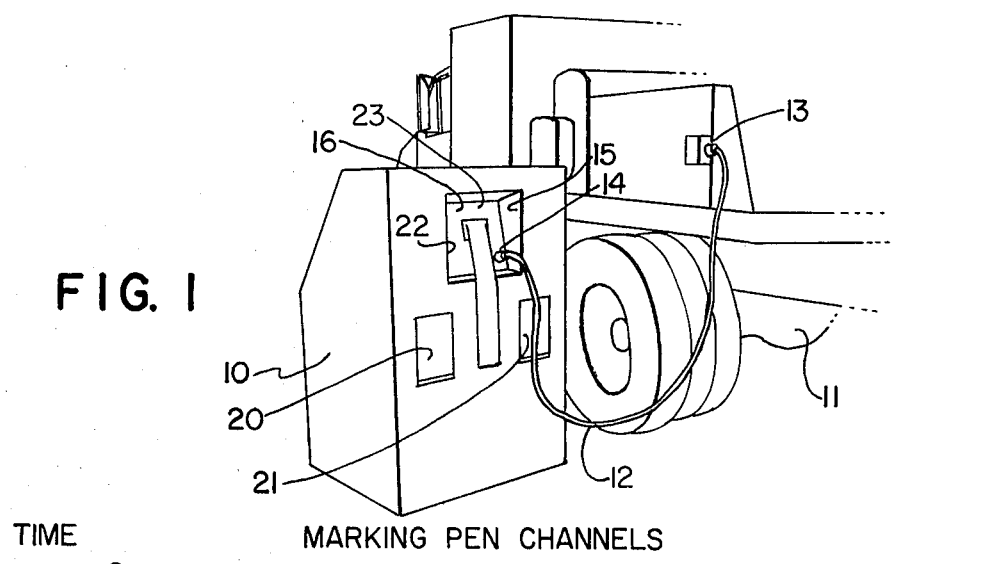
FIG. 1 is a perspective view of the testing unit constructed in accordance with this invention and a vehicle under test.

In FIG. 1, a testing unit incorporating this invention is housed in a console cabinet 10 and connects to a vehicle 11. A plurality of transducers are permanently affixed to the vehicle 11 at various critical points. Each transducer is connected to a single bus conductor in a cable 12 terminating, respectively, at connector blocks 13 and 14 at the vehicle and the testing unit, identified as testing unit 16.

The console cabinet 10 contains two receptacles or storage bins 20 and 21 for storing accessories. For example, the bin 20 might store a pair of earphones while the bin 21 might store a tape recorder; both can connect to testing unit 16, as described later. At the upper portion of the console cabinet 10 there is another storage bin 22 which receives and supports the testing unit 16.

Figure 2:
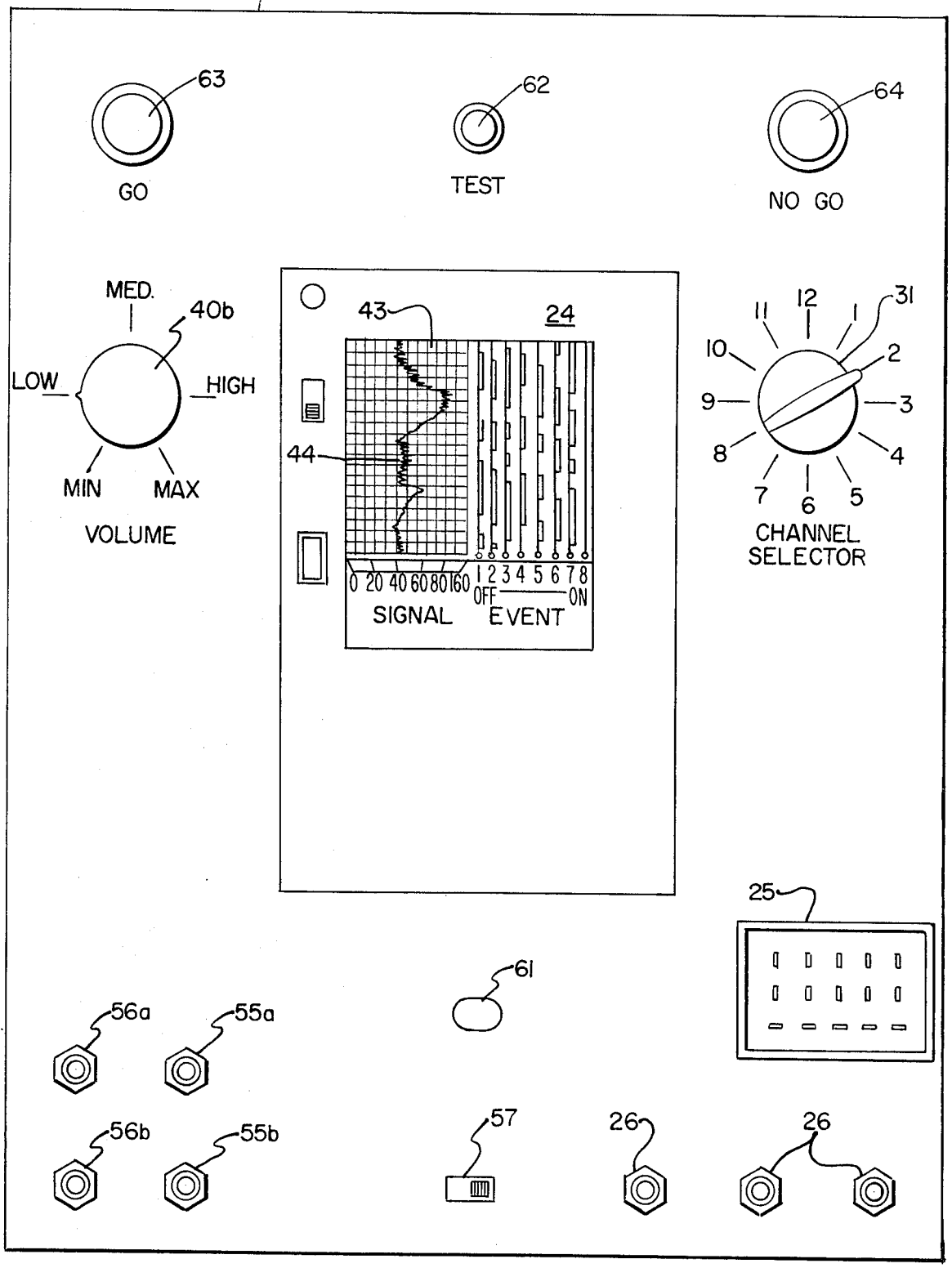
FIG. 2 is a plan view of a control panel for use in a testing unit shown in FIG. 1.

Referring now to FIGS. 1 and 2, a front control panel 23 on the testing unit 16 is accessible from the front of the console cabinet 10. A multiple channel graphic recorder 24 is centrally disposed in the control panel 23. Graphic recorders of this type are well known in the art and contain a plurality of marking channels which respond to incoming signals by positioning their respective pens over graph paper. A motor in the recorder advances the paper as the pens mark thereby to correlate time and position on the resulting graph.

With specific reference to FIG. 2, a plug 25 forms one part of connection 14 shown in FIG. 1 to couple signals from the transducers into the testing unit. A plurality of input jacks 26 enable single transducers to be connected into the testing unit 16.

Figure 3:
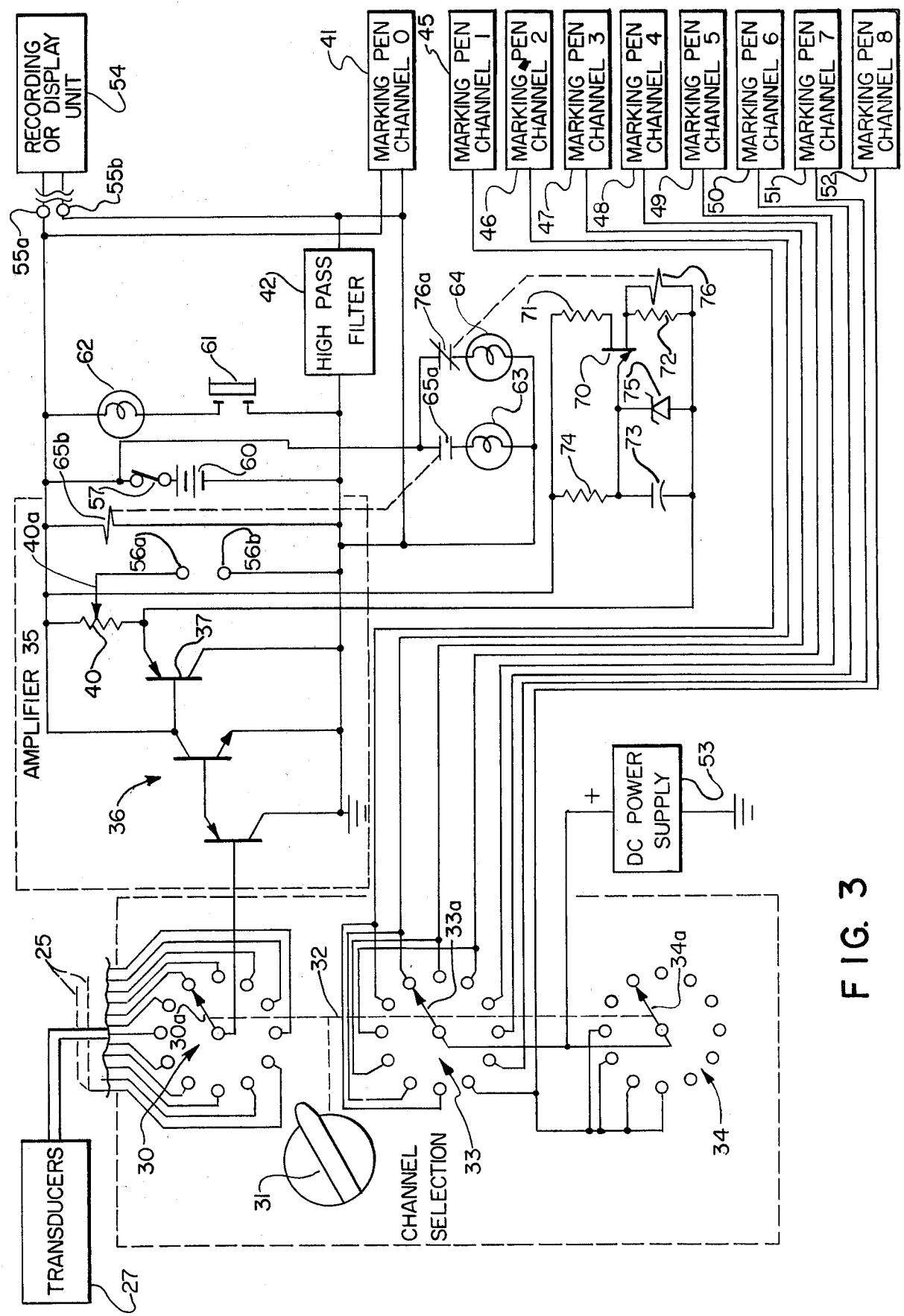
FIG. 3 is a schematic diagram of a portion of the electronic circuit in the testing unit shown in FIG. 1.

Referring to FIGS. 2 and 3, the transducers are shown collectively in a block 27. Each transducer is coupled to a channel selection switch 30 controlled by a knob 31 on the front panel. As the channel selector knob 31 rotates from one position to another, it rotates a shaft 32 (shown as a dashed line) to position an arm 30a in the rotary switch 30 and arms 33a and 34a in rotary switches 33 and 34.

As shown in FIG. 2 and 3, the channel selector knob 31 is positioned to select input 2. The incoming signal from transducer 2 passes into an amplifier 35 including an amplifier circuit 36. An output stage 37 develops an output signal across a resistor 40 between the emitter and base of the output stage 37. The output signal passes to a marking pen channel designated CHANNEL 0, denoted by reference numeral 41. A high pass filter 42 connects in series with the output to eliminate low frequency noise. Thus, the marking pen channel 41 receives the incoming signal and traces on graph paper 43, shown in FIG. 2, a permanent representation of the time development of that signal. An example of such a graph is identified by reference numeral 44.

As also shown in FIG. 2, pens in the remaining channels (e.g., eight channels in a nine-channel recorder) also mark the graph and the pattern of their tracings uniquely identifies the transducer which is being monitored to correlate each portion of the recorded audio signal to its corresponding sensor. These marking pen channels, CHANNEL 1 through CHANNEL 8 identified by reference numerals 45 through 52, receive one of two input voltages. Normally the input is either at ground or some fixed, finite voltage to provide a series of "step-wise" shifts between two limits. The particular voltage pattern which is applied to the inputs of the channels is determined by the switches 33 and 34.

Referring specifically to FIG. 3, a DC power supply 53 provides a fixed positive potential to the arms 33a and 34a on each of the switches 33 and 34. The contacts on switches 33 and 34 are connected to the marking pen channels to provide a known pattern for each position of the knob 31 and hence the arms 30a, 33a, and 34a. A simple arrangement is shown in FIG. 3 in which the sum of the numbers of all the active channels is the number of the transducer. Specifically, the inputs of the marking pen channels for individual ones of the CHANNELS 1 through 8 connect directly to the contacts on switch 33 corresponding to positions 1 through 8 of the knob 31. Thus, one channel will mark for each of the first eight input positions. FIGS. 2 and 3 show a 12-position switch. For the next series of positions, CHANNEL 8 is always energized and CHANNELS 1 through 7 are energized in succession. For example, for position 10, CHANNEL 8 and CHANNEL 2 are both energized.

Thus, in accordance with one aspect of this invention, each time the operator changes the channel selector switch knob 31, the circuitry shown in FIG. 3 causes the marking pen channels to trace a graph representing a signal from a selected transducer and automatically mark, in the adjacent channels, the identity of the selected transducer.

Figure 4:
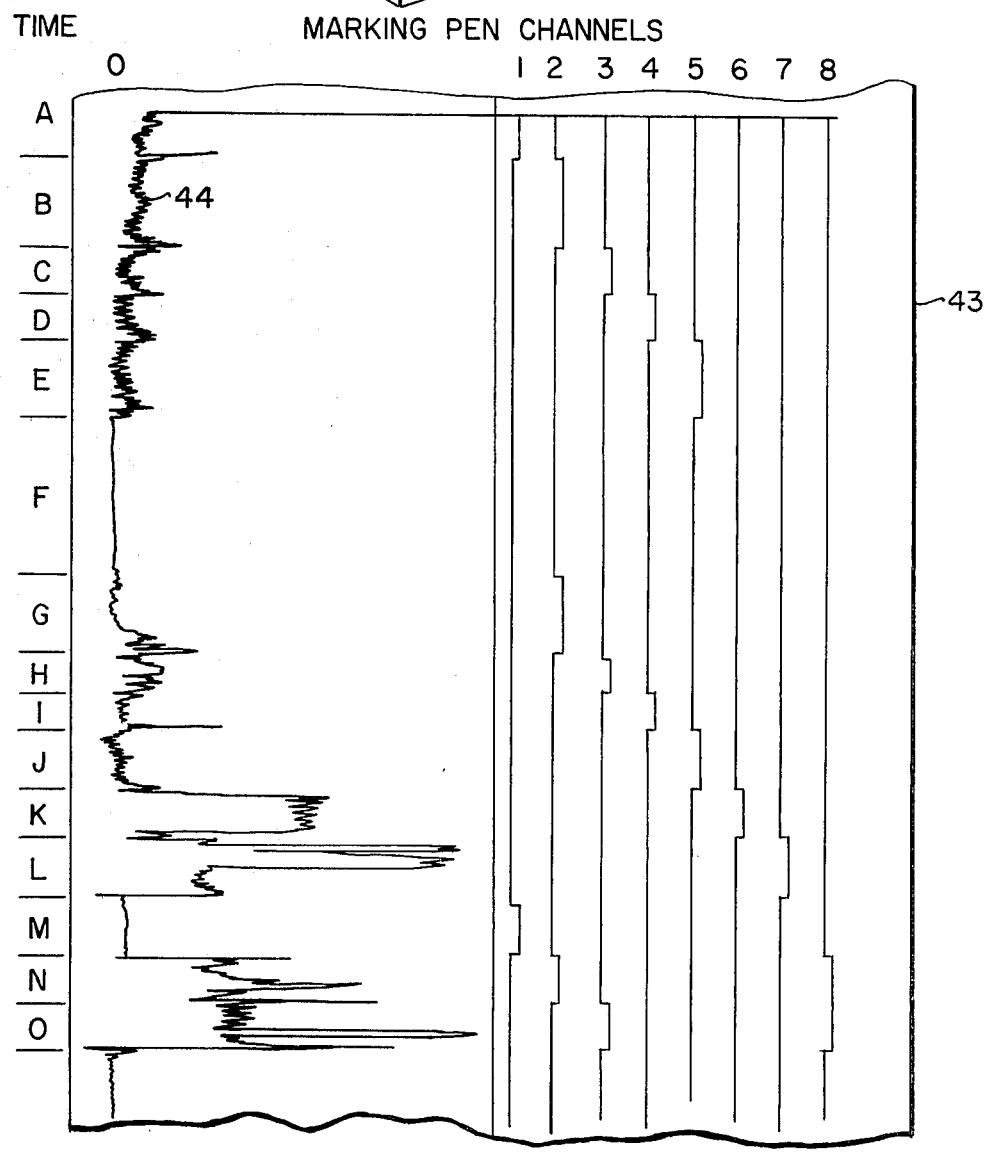
FIG. 4 depicts a typical recording made on a graphic recorder using the testing unit shown in FIGS. 1 and 2.

FIG. 4 shows a typical graph. Different portions are denoted by letters A through O and their boundaries define points at which the knob 31 is moved from one location to another. It is clear from looking at FIG. 4, that the graph 44, during time A, represents the incoming signal from transducer No. 1 as only the pen in CHANNEL 1 produces an active mark. Similarly in times B, C, D and E the graph 44 depicts the signals received from transducer numbers 2, 3, 4 and 5 respectively. During times M, N and O, the graph 44 represents the signals from transducer numbers 8, 9 and 10, respectively.

The automatic indentification of each transducer simplifies comparisons between different tests. For example, a new or properly operating vehicle can be tested and the resulting chart can be produced on transparent chart paper and kept as a permanent reference chart. A test chart from a subsequent test is readily compared by placing the reference chart over the test chart. The marks identifying the same sensor are easily superimposed to correlate the transducer signals for comparison.

As previously indicated, the storage bin 21 in FIG. 1 may contain a tape recorder to record the audio signals from the selected transducer. An oscilloscope might also display such a signal. FIG. 3 shows a representative recording or display unit 54 which connects through the high-pass filter 42 to the output resistor 40. Jacks 55a and 55b shown in FIG. 2 and represented as terminals 55a and 55b in FIG. 3, provide a means for connecting such a unit 54 across the output resistor 40.

Output jacks 56a and 56b on panel 23 shown in FIG. 2, are also shown in FIG. 3 as terminals 56a and 56b. They connect earphones which might be stored in bin 20 in series with a wiper arm 40a. The wiper arm 40a, controlled by a knob 40b on the front panel (FIG. 2), provides volume control. Assuming that the earphones have sufficient impedance, they do not affect the output signal transmitted to the marking pen channel 41 or the recording display unit 54.

Another control on the front panel shown in FIG. 2 is an on-off switch 57 which connects a battery 60 (FIG. 3) to the amplifier circuit as a power supply. This battery also may provide the function of the DC power supply 53. A momentary ON switch 61 and a lamp 62 constitute a test circuit for the battery 60. The lamp 62, as apparent, will not light when the switch 61 is depressed if the battery voltage is below a safe level. Other testing circuits might also perform this function.

The front panel 23 also includes a GO light 63 and a NO GO light 64. The GO light 63 is energized by closing normally open relay contacts 65a under the control of a relay coil 65b. The relay coil 65b receives as an input signal the voltage from output resistor 40 and is chosen to close the contacts 65a at some output voltage which represents a minimum safe condition.

In order for this test to be effective and also to simplify the other tests, all transducers are calibrated to a fixed standard. Any of several known calibration procedures can be used, including calibrating each transducer individually or inserting individual calibration circuits in the testing unit in series with each incoming wire.

A unijunction oscillator circuit constructed in accordance with another aspect of this invention controls the NO GO lamp 64. The oscillator comprises a unijunction transistor 70 with base resistors 71, and 72 and a timing circuit comprising a timing capacitor 73 and a timing resistor 74. The output signal across the resistor 40 energizes the timing circuit and normally maintains the relaxation oscillator in oscillation as the output signal increases. This energizes a relay coil 76 to keep contacts 76a open and the NO GO light 64 off. However, at some magnitude of voltage, representing a maximum allowable current, a zener diode 75 in parallel with the timing capacitor 73 breaks down and clamps the emitter junction to a value which never exceeds the peak point voltage for the emitter. This stops oscillation, so the contacts 76a close and the NO GO light turns on.

This circuit in FIG. 3 has a fixed GO/NO GO range. If it is desired to alter that range, another control knob could be placed on the panel to adjust a potentiometer which would replace the fixed resistor 74 in the relaxation oscillator circuit.

Thus, in accordance with this invention, there is provided a testing unit which simplifies the testing procedures because it automatically correlates graphical representations of a signal with its source transducer. In addition, the circuit contains a circuit which definitively sets a limit on an upper range.

It will be apparent that many of the circuit embodiments can be altered. For example, we have shown a sensor identification system in which the sensor number equals the sum of the active individual identification channels. The switches 33 and 34 could connect to produce an eight-bit binary identification system. Other circuit elements may also be substituted. Therefore, it is an object of this invention to cover all such variations and modifications as come within the true spirit and scope of this invention.

I claim:

1. A testing unit for recording electrical signals from a plurality of transducers, said testing unit including:
   A. a multiple channel graphic recording means, each channel including means for marking a chart in response to an input signal to that channel, one channel being reserved for an incoming transducer signal and each of a plurality of remaining channels being reserved to respond to incoming identification signals, said remaining channels thereby constituting an identification set, B. selection means for receiving all incoming transducer signals to couple one signal to said one channel, and C. encoding means responsive to said selection means for transmitting to said channels in said identification set a pattern of identification signals corresponding to the selected transducer, said recording means thereby simultaneously and continuously recording the output of the selected transducer and a pattern of identification marks representing the identification of the selected transducer.

2. A testing unit as recited in claim 1 wherein said selection means includes a multiple position switch with a plurality of stationary contacts connected to the respective transducers and the common contact being connected to said one reserved channel.

3. A testing unit as recited in claim 2 wherein said encoding means comprises second multiple position switching means operable with said first multiple position switching means.

4. A unit as recited in claim 1 including amplifier means in circuit with the output of said selection means to amplify said incoming signal, said amplified signal being coupled to said one reserved channel.

5. A unit as recited in claim 4 additionally including means monitoring said amplifier output for indicating when the output signal therefrom exceeds a predetermined maximum.

6. A testing unit as recited in claim 5 wherein said monitoring means includes a unijunction relaxation oscillator circuit for receiving the amplified signal, said relaxation oscillator circuit including a timing capacitor and a zenner diode in parallel therewith, said diode clamping the input voltage to said unijunction transistor relaxation oscillator to thereby disable said oscillator, and lamp means connected to output of the oscillator, said lamp being illuminated when the amplified signal exceeds the predetermined maximum.

7. A testing unit for recording electrical signals from a plurality of transducers, said testing unit including:

A. a multiple channel graphic recording means, each channel including means for marking a chart in response to an input signal for that channel, one channel being reserved for an incoming transducer signal and each of the remaining channels being reserved for an incoming identification signal, said remaining channels thereby constituting an identification set, B. selection means for receiving all incoming transducer signals to couple one signal to said one channel, C. encoding means responsive to said selection means for energizing said identification set to specifically identify the selected transducer, and D. monitoring means including a unijunction relaxation oscillator circuit for receiving the one signal from said amplifier means and lamp means, said relaxation oscillator circuit including a timing capacitor and a zener diode in parallel therewith, said diode clamping the input voltage to said unijunction transistor relaxation oscillator to thereby disable said oscillator when the one signal exceeds a predetermined maximum, said lamp means being illuminated when said oscillator is disabled.

* * * * *